G. R. MILLIGAN.
TRACTION ATTACHMENT FOR AUTOMOBILES.
APPLICATION FILED JAN. 2, 1918.

1,275,720.

Patented Aug. 13, 1918.

Inventor:
George R. Milligan,
by Hazard & Miller
Attys.

UNITED STATES PATENT OFFICE.

GEORGE R. MILLIGAN, OF LOS ANGELES, CALIFORNIA.

TRACTION ATTACHMENT FOR AUTOMOBILES.

1,275,720.  Specification of Letters Patent.  Patented Aug. 13, 1918.

Application filed January 2, 1918. Serial No. 210,078.

*To all whom it may concern:*

Be it known that I, GEORGE R. MILLIGAN, a citizen of the United States, residing at Los Angeles, in the county of Los Angeles and State of California, have invented new and useful Improvements in Traction Attachments for Automobiles, of which the following is a specification.

My object is to make an improved traction attachment which may be readily applied to an automobile or removed therefrom.

Figure 1:
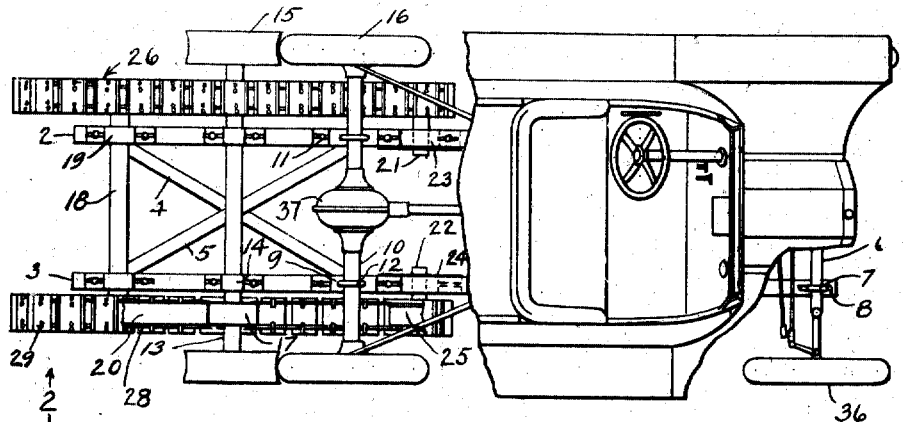
Figure 1 is a plan showing a traction attachment embodying the principles of my invention applied to an automobile, parts of the automobile being broken away to show the traction attachment and parts of the attachment being broken away to show the details of construction.
Figure 3:
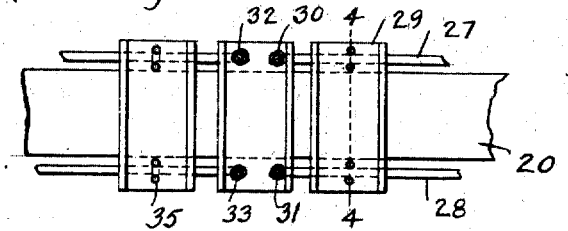
Fig. 3 is an enlarged fragmentary detail plan showing the construction of the traction belt.
Figure 4:
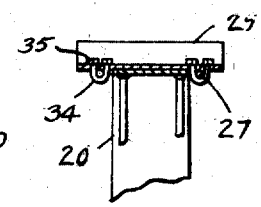
Fig. 4 is a cross-section on the line 4—4 of Fig. 3.
Figure 2:
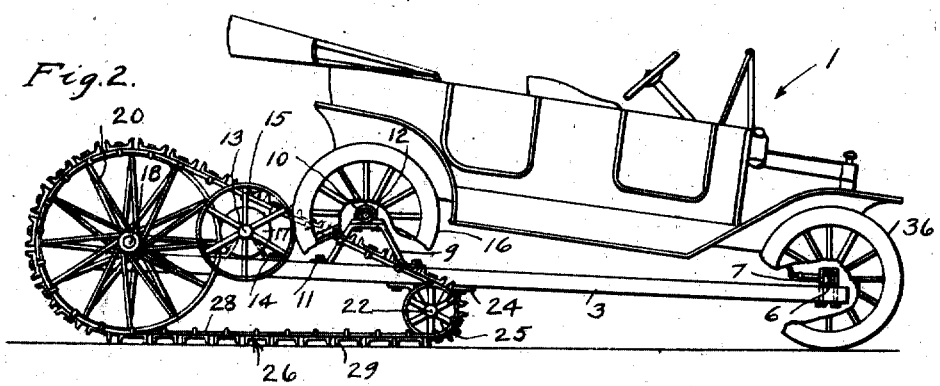
Fig. 2 is a side elevation looking in the direction indicated by the arrow 2 in Fig. 1, parts of the automobile being broken away to show the traction attachment.

The automobile 1 may be any of the well-known constructions. The traction attachment frame consists of the sills 2 and 3 rigidly connected together by cross pieces 4 and 5, and in applying the attachment to an automobile the sills 2 and 3 are placed under the automobile between the automobile wheels, and the forward ends of the sills are connected to the front axle housing 6 by U-bolts 7 inserted downwardly and embracing the axle housing and inserted through slotted openings 8 in the sills, so that the sills may be adjusted forwardly or backwardly to the extent of the openings 8. Pillar brackets 9 are mounted upon the sills 2 and 3 under the rear axle housing 10 and connected to the sills 2 and 3 by bolts 11 inserted downwardly through longitudinally slotted openings in the feet of the brackets and through the sills, so that the brackets may be adjusted forwardly or backwardly upon the sills. U-bolts 12 are inserted downwardly in position to embrace the axle housing 10, and through the brackets 9. A countershaft 13 is rotatably mounted in bearings 14 adjustably fixed upon the sills 2 and 3, and friction wheels 15 are fixed upon the ends of the shaft 13 in position to engage the drive wheels 16 of the automobile, so that as the automobile engine runs, the shaft 13 will be driven. A second set of friction wheels 17 is fixed upon the shaft 13, the wheels 17 being considerably smaller than the wheels 15. A traction axle 18 is mounted in bearings 19 adjustably fixed upon the rear ends of the sills 2 and 3, and the large traction driving wheels 20 are loosely mounted upon the ends of the axle 18 in position to be frictionally engaged and driven by the wheels 17. Stub shafts 21 and 22 are fixed in bearings 23 and 24 adjustably mounted upon the sills 2 and 3 in front of the driving wheels 16, and the small idler traction wheels 25 are loosely mounted upon the outer ends of these stub shafts 21 and 22 in line with the traction driving wheels 20.

The traction belts 26 are mounted to run around the wheels 20 and 25, so that the belts will contact with the ground between the vertical planes of the axle 18 and the stub shafts 21 and 22. The traction belts each comprise wire cables 27 and 28 and channel iron cleats 29 secured crosswise of the two cables. Corresponding ends 30 and 31 of the cables 27 and 28 are inserted through a cleat 29 and knotted or otherwise fastened, and the cables are cut to the desired length, and the other ends 32 and 33 are inserted through the same cleat 29 and knotted or fastened to produce endless belts. The other cleats 29 are secured to the cables 27 and 28 by U-bolt clamps 34 embracing the cables and inserted through the cleats and having clamping nuts 35 within the channels of the cleats, so as to securely clamp the cleats 29 to the cables suitable distances apart and regularly spaced around the belt.

The belts are constructed as near as practicable to the desired length and then placed around the wheels 20 and 25, and the bearings 19, 23 and 24 are adjusted upon the sills 2 and 3 to tighten the belts to the desired extent. Then the bearings 14 are adjusted to bring the wheels 17 to contact with the wheels 20 and the brackets 9 are adjusted to bring the drive wheels 16 into contact with the wheels 15. The brackets 9 hold the drive wheels 16 clear of the ground while the front wheels 36 of the automobile run upon the ground for steering purposes. The engine of the automobile drives the traction belts 26 through the differential 37 of the automobile. The traction belts 26 may be made of any desired width and the ratio of speed between the drive wheels 16 and the traction wheels 20 may be reduced to any desired extent by changing the relative sizes of the wheels 15 and 17. The attachment may be readily removed from the automobile by removing the U-bolts 12 from the rear axle 10 and the U-bolts 7 from the front axle 6.

While I have here shown the preferred construction of my traction attachment for automobiles as now known to me, it will be understood by those skilled in the art that various changes in the construction, combination and arrangement of parts may be made without departing from the spirit of my invention as claimed.

I claim:

In a traction attachment, a traction frame adapted to be mounted below the body of an automobile and secured to the axle housings, traction wheels supporting the rear end of the frame, traction idlers in line with the traction wheels, traction belts running upon the traction wheels and idlers, friction wheels adapted to be driven by contact with the drive wheels of the automobile, and connections between the friction wheels and the traction wheels for driving the traction wheels.

In testimony whereof I have signed my name to this specification.

GEO. R. MILLIGAN.